United States Patent
Usami et al.

(10) Patent No.: US 7,625,506 B2
(45) Date of Patent: *Dec. 1, 2009

(54) OPTICAL RECORDING MEDIUM PRODUCING METHOD, AND OPTICAL RECORDING MEDIUM PRODUCING DEVICE

(75) Inventors: Mamoru Usami, Tokyo (JP); Junichi Ide, Tokyo (JP); Haruhiko Yamaguchi, Tokyo (JP); Tomoki Ushida, Tokyo (JP)

(73) Assignee: TDK Corporation, Tokyo (JP)

( * ) Notice: Subject to any disclaimer, the term of this patent is extended or adjusted under 35 U.S.C. 154(b) by 682 days.

This patent is subject to a terminal disclaimer.

(21) Appl. No.: 10/528,778

(22) PCT Filed: Sep. 18, 2003

(86) PCT No.: PCT/JP03/11941
§ 371 (c)(1),
(2), (4) Date: Aug. 22, 2005

(87) PCT Pub. No.: WO2004/029952
PCT Pub. Date: Apr. 8, 2004

(65) Prior Publication Data
US 2006/0177534 A1  Aug. 10, 2006

(30) Foreign Application Priority Data
Sep. 24, 2002 (JP) ............................. 2002-276491

(51) Int. Cl.
B29D 17/00 (2006.01)
(52) U.S. Cl. ..................... 264/1.33; 264/1.38; 264/1.7; 264/1.9
(58) Field of Classification Search .................. 264/1.33
See application file for complete search history.

(56) References Cited

U.S. PATENT DOCUMENTS
7,047,859 B2 * 5/2006 Ide et al. ..................... 83/621

(Continued)

FOREIGN PATENT DOCUMENTS
JP           58-045637           3/1983

(Continued)

OTHER PUBLICATIONS
English Language Abstract of JP 10-289489.

(Continued)

Primary Examiner—Kat Wyrozebski
Assistant Examiner—Robert J Grun
(74) Attorney, Agent, or Firm—Greenblum & Bernstein P.L.C.

(57) ABSTRACT

When manufacturing an optical recording medium by forming a resin layer on a surface of a substrate and then forming a center hole that passes through the substrate and the resin layer, a method of manufacturing an optical recording medium according to the present invention forms the center hole by forming, in the resin layer, a circular cut with a larger diameter than the center hole so as to surround a formation position of the center hole and then pressing in a punching blade for forming the center hole from a rear surface side of the substrate. By doing so, detachment of the resin layer and the production of burrs at or near the center hole can be avoided while reducing the manufacturing cost.

7 Claims, 7 Drawing Sheets

U.S. PATENT DOCUMENTS

| | | | |
|---|---|---|---|
| 7,096,770 B2 * | 8/2006 | Ide et al. | 83/682 |
| 7,270,527 B2 * | 9/2007 | Ide et al. | 425/174.2 |
| 2004/0149111 A1 | 8/2004 | Ide et al. | |
| 2005/0201264 A1 * | 9/2005 | Ushida et al. | 369/275.5 |

FOREIGN PATENT DOCUMENTS

| | | |
|---|---|---|
| JP | 61-175946 | 8/1986 |
| JP | 63-203308 | 8/1988 |
| JP | 5-337899 | 12/1993 |
| JP | 10-040584 | 2/1998 |
| JP | 10-289489 | 10/1998 |
| JP | 2002-298453 | 11/2002 |
| JP | 2004-39149 | 2/2004 |

OTHER PUBLICATIONS

English Language Abstract of JP 10-040584.
English Language Abstract of JP 63-203308.
English Language Abstract of JP 61-175946.
English Language Abstract of JP 58-045637.
English Language Abstract of JP 5-337899.
English Language Abstract of JP 2002-298453.
U.S. Appl. No. 10/762,245 to Ide et al., filed Jan. 23, 2004.
U.S. Appl. No. 10/829,266 to Koyama et al., filed Apr. 22, 2004.
English language Abstract of JP 2004-39149, Feb. 5, 2004.

* cited by examiner

RELATED ART

FIG. 15

RELATED ART

FIG. 16

RELATED ART

OPTICAL RECORDING MEDIUM PRODUCING METHOD, AND OPTICAL RECORDING MEDIUM PRODUCING DEVICE

TECHNICAL FIELD

The present invention relates to a method of manufacturing an optical recording medium, where a center hole that passes through a disc substrate and a resin layer is formed after the resin layer has been formed on one surface of the disc substrate, and to an optical recording medium manufacturing apparatus constructed so as to be able to manufacture an optical recording medium in accordance with such method.

BACKGROUND ART

An optical disc (optical recording medium) such as a CD or DVD is normally manufactured by forming thin films such as a light reflecting layer by sputtering or the like on a disc-like substrate in whose surface grooves and lands have been formed by injection molding and then forming a resin layer as a protective layer (cover layer) by spin coating so as to cover the thin films. Also, when manufacturing a recordable optical disc such as a CD-R, a CD-RW, a DVD-R, and a DVD-RW, after thin films such as a recording layer and a light reflecting layer have been formed in order by sputtering or the like on the surface of a substrate, a resin layer as a protective layer is formed by spin coating so as to cover the thin films. When doing so, if fluctuations are produced in the thickness of the resin layer of a completed optical disc, it will be difficult to read and write recording data properly. Accordingly, when the resin layer is formed, it is necessary to spin coat a resin material for forming the resin layer across the entire substrate surface with a uniform thickness. To form a resin layer with a uniform thickness on a substrate by spin coating, the resin material should preferably be dripped onto a center of a substrate that is being rotated. However, since it is necessary to provide a center hole for clamping (chucking) in a recording/reproduction apparatus or the like in a center of the optical disc, it is difficult to drip the resin material at a center of the substrate during spin coating. For this reason, the applicant has developed a method of manufacturing an optical disc where a resin material is dripped to form a resin layer with a uniform thickness before the center hole is formed, and then the center hole is punched out so as to pass through the substrate and the resin layer.

Figure 14:
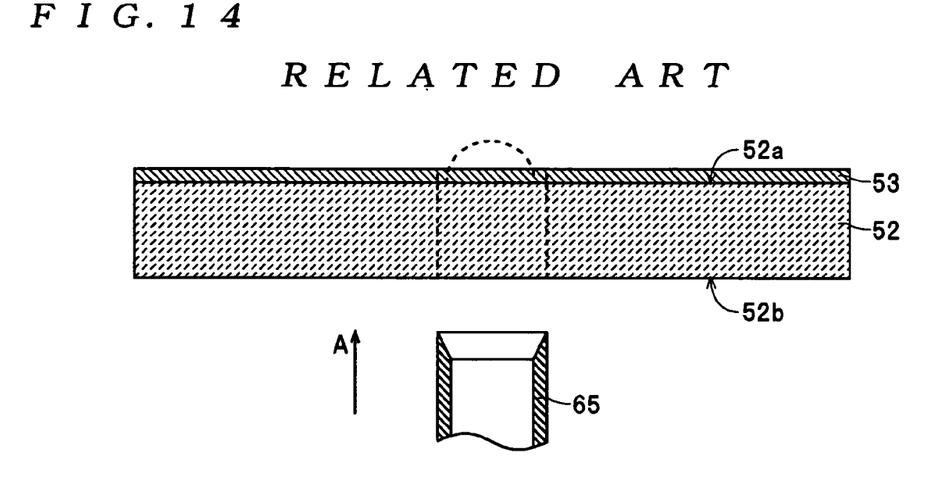
FIG. 14 is a cross-sectional view of a state where a resin layer 53 has been formed on a substrate 52 during the manufacturing of the conventional optical disc 51.
Figure 15:
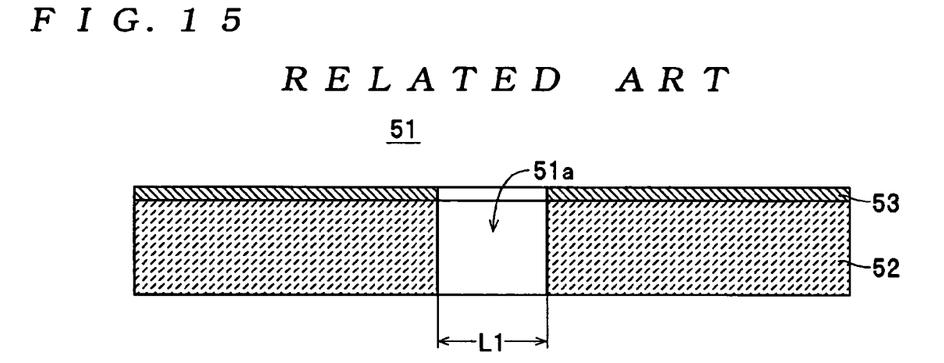
FIG. 15 is a cross-sectional view of an optical disc 51.

More specifically, as shown in FIG. 14, a resin material is spin coated onto a surface 52a of a disc-like substrate 52, in a center of which a center hole has not been formed. When doing so, as shown by the broken line in FIG. 14, a UV-curing resin material, for example, is dripped onto a center (a position where the center hole will subsequently be formed) of the substrate 52 that is being rotated by an applying apparatus and the resin material spreads toward the outer edge of the substrate 52 due to the centrifugal force that accompanies the rotation. Here, by appropriately adjusting the rotational speed of the substrate 52, the resin material can be applied uniformly across the entire surface of the substrate 52. The resin material on the substrate 52 is then irradiated with UV rays to harden the resin material and thereby form a resin layer 53. After this, a cylindrical punching blade 65 for forming the center hole 51a is pressed into the substrate 52 in the direction of the arrow A from a rear surface 52b side to punch out the part shown by the broken line in FIG. 14. By doing so, as shown in FIG. 15, the center hole 51a with a diameter L1 of around 15 mm is formed so as to pass through the substrate 52 and the resin layer 53, thereby completing the optical disc 51.

On the other hand, Japanese Laid-Open Patent Publication No. H10-289489 discloses a method of manufacturing an optical recording medium where a light transmitting layer (18) is formed by dripping light-curing resin in a state where a center hole (10h) formed in a substrate (10) has been blocked by a blocking plate (21). In this method of manufacturing, a concave part (20) is formed in a periphery of the center hole when manufacturing the substrate, and when the light-curing resin is to be dripped, the blocking plate is fitted into this concave part to form a composite substrate and block the center hole. By doing so, it is possible to drip the light-curing resin on the center part of the substrate (in this case, the center part of the blocking plate). After the light-curing resin that has been dripped on the center part of the substrate has been spread out and cured with light, the blocking plate and the light transmitting resin are punched out by a center hole punching device (71) to form the center hole. By doing so, an optical recording medium is manufactured.

DISCLOSURE OF THE INVENTION

Figure 16:
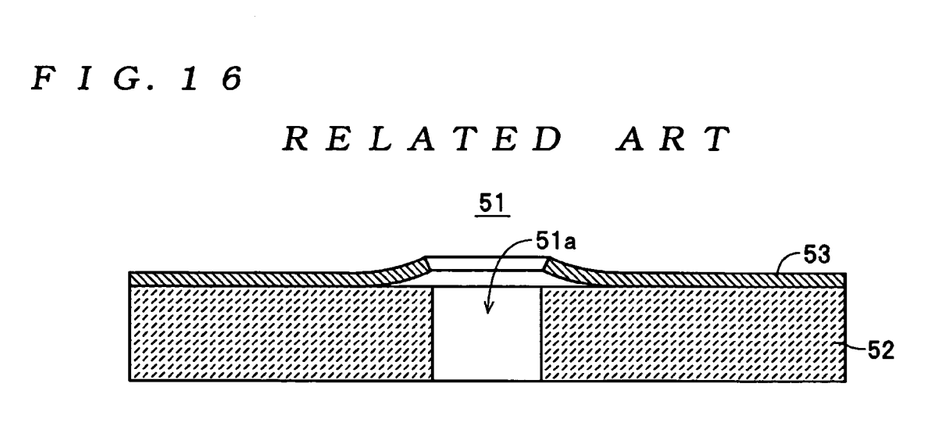
FIG. 16 is a cross-sectional view of a state where the resin layer 53 in a periphery of a center hole 51a has been detached from the substrate 52.

By investigating the method of manufacturing the optical disc 51 described above, the present inventors discovered the following problems to be solved. That is, after the resin layer 53 has been formed with uniform thickness on the substrate 52 in which a center hole has not been formed, the center hole 51a is punched out. In this case, the resin layer 53 formed on the substrate 52, is extremely thin at 100 μm. For this reason, when the punching blade 65 is pressed into the substrate 52 from the rear surface 52b during the formation of the center hole 51a, as shown in FIG. 16, there is the risk of the resin layer 53 becoming detached from the substrate 52 in the periphery of the formation position of the center hole 51a. Here, since it is difficult to cleanly punch out the thin resin layer 53 using the punching blade 65 when the center hole 51a is formed, there is also the risk of burrs being produced in the rim of the center hole 51a that has been punched out. In addition, even if the resin layer 53 is not detached when the center hole 51a is formed, there is the risk of the resin layer 53 becoming detached from the substrate 52 due to the rim of the center hole 51a being chafed by the recording/reproduction apparatus when the optical disc 51 is clamped in a recording/reproduction apparatus.

On the other hand, in the method of manufacturing an optical recording medium disclosed in Japanese Laid-Open Patent Publication No. H10-289489, the center hole is formed by punching out using a center punching device from the side on which a light transmitting layer is formed. According to this method, although detachment of the optical transmitting layer can be avoided, in the same way as the method of manufacturing the optical disc 51 described above, there is the risk of burrs being produced at the rim of the punched out center hole. Also, in this method of manufacturing an optical recording medium, the substrate and the blocking plate are formed separately and the blocking plate has to be fitted into the concave part when the light-curing resin is dripped, so that there is the problem of an increase in the manufacturing cost of the optical recording medium.

The present invention was conceived in view of the problems to be solved described above, and it is a principal object of the present invention to provide a method of manufacturing an optical recording medium and an optical recording medium manufacturing apparatus that can avoid detachment of the resin layer and the production of burrs at or near the center hole while reducing the manufacturing cost.

A method of manufacturing an optical recording medium according to the present invention manufactures the optical recording medium by forming a resin layer on a first surface of a disc-like substrate and then forming a center hole that passes through the disc-like substrate and the resin layer, wherein the center hole is formed by forming, in the resin layer, a circular cut with a larger diameter than the center hole so as to surround a formation position of the center hole and then pressing a punching blade for forming the center hole into the disc-like substrate from a second surface side of the disc-like substrate.

An optical recording medium manufacturing apparatus according to the present invention is capable of forming a center hole that passes through a disc-like substrate and a resin layer that has been formed on a first surface of the disc-like substrate, and includes: a cut forming blade that can form a circular cut with a larger diameter than the center hole in the resin layer so as to surround a formation position of the center hole; a punching blade for forming the center hole; and a control unit that controls movement of the cut forming blade and the punching blade, wherein the control unit forms the cut by moving the cut forming blade toward the resin layer and pressing the cut forming blade into the resin layer and then forms the center hole by moving the punching blade toward the disc-like substrate from a second surface side of the disc-like substrate and pressing in the punching blade.

With the above method of manufacturing an optical recording medium and optical recording medium manufacturing apparatus, the center hole is formed by forming, in the resin layer, the circular cut with a larger diameter than the center hole so as to surround the formation position of the center hole and then pressing in the punching blade for forming the center hole from the second surface side of the disc-like substrate, so that it is possible to avoid detachment of the resin layer from the first surface of the disc-like substrate when the center hole is formed by pressing the punching blade into the disc-like substrate.

Here, it is preferable to form the cut in the resin layer with a depth that reaches the first surface by the cut forming blade. By doing so, it is possible to avoid detachment of the resin layer during the punching out of the center hole more reliably. Since a hole with a larger diameter than the center hole is formed in the resin layer of the optical recording medium after manufacturing, chafing of the resin layer (the rim of the hole) when the optical recording medium is clamped in a recording/reproduction apparatus can be avoided, and as a result, detachment of the resin layer during clamping can be avoided. In addition, by forming the cut in the resin layer in advance, it is possible to avoid the production of burrs in the resin layer during the punching out of the center hole.

Here, a substrate pressing jig should preferably be placed in contact with the second surface of the disc-like substrate and the contact should be maintained while the cut is formed in the resin layer. By doing so, bending of the disc-like substrate when the cut forming blade is pressed into the resin layer can be avoided, and as a result, the resin layer can be reliably cut when the blade edge of the cut forming blade is placed in contact with the first surface of the disc-like substrate.

In addition, a resin layer pressing jig should preferably be placed in contact with the resin layer and the contact should be maintained while the center hole is formed by pressing the punching blade into the disc-like substrate. By doing so, it is possible to avoid bending of the disc-like substrate when the punching blade is pressed into the disc-like substrate, and as a result, it is possible to avoid detachment of the resin layer and damage to the disc-like substrate due to bending of the disc-like substrate. Also, by pressing the rim of the hole in the resin layer with the resin layer pressing jig, it is possible to avoid detachment at the rim of the hole when the punching blade has reached the first surface of the disc-like substrate.

Also, the cut should preferably be formed in the resin layer by placing the resin layer pressing jig, in which a cut forming blade is formed with a height in accordance with a depth of the cut, in contact with the resin layer. By doing so, compared to a method where a cut is formed by a dedicated cut forming blade and then the cut forming blade is placed on standby and a pressing jig dedicated to pressing the resin layer is placed in contact with the resin layer, it is possible to form a cut with the cut forming blade simply by placing the resin layer pressing jig in contact with the resin layer, with it also being possible to press in the punching blade with the resin layer being pressed in this state. This means that it is possible to form the cut and the center hole quickly and easily while avoiding damage and the like to the disc substrate.

In addition, the center hole should preferably be formed by pressing the punching blade into the disc-like substrate while vibration is applied to the punching blade using ultrasound. By doing so, the punching blade can be smoothly pressed into the disc-like substrate.

Also, in the method of manufacturing an optical recording medium according to the present invention, when the disc-like substrate is molded, a concave part with an equal diameter or a substantially equal diameter to the center hole should preferably be formed at the formation position of the center hole in the second surface of the disc-like substrate. By doing so, compared to a method where the center hole is formed by pressing a punching blade into a substrate in which a concave part has not been formed, it is possible to form the material punched out by the punching blade thinly, so that the center hole can be formed easily. In this case, by forming the concave part with a diameter that is equal to the diameter of the center hole, it is possible to have the inner wall surface of the concave part function as a guide for the punching blade, and as a result, it is possible to avoid having the center hole formed in an eccentric position.

Also, an optical recording medium manufacturing apparatus according to the present invention should preferably further include a positioning convex part that is formed so as to be capable of engaging a positioning hole formed in the disc-like substrate at a center of a formation position of the center hole, is attached to a center of the punching blade via an elastically deforming part, and is projected beyond a blade edge of the punching blade. With this construction, it is possible to have the positioning convex part contact the rim of the positioning hole before the punching blade to align the center of the punching blade and the center of the disc-like substrate, so that the formation of the center hole at an eccentric position can be reliably avoided.

It should be noted that the disclosure of the present invention relates to a content of Japanese Patent Application 2002-276491 that was filed on 24 Sep. 2002 and the entire content of which is herein incorporated by reference.

BEST MODE FOR CARRYING OUT THE INVENTION

Preferred embodiments of a method of manufacturing an optical recording medium and an optical recording medium manufacturing apparatus according to the present invention will now be described with reference to the attached drawings.

First, an optical disc 1 manufactured according to the method of manufacturing an optical recording medium according to the present invention and the construction of a manufacturing apparatus 11 for manufacturing the optical disc 1 will be described with reference to the drawings.

Figure 1:
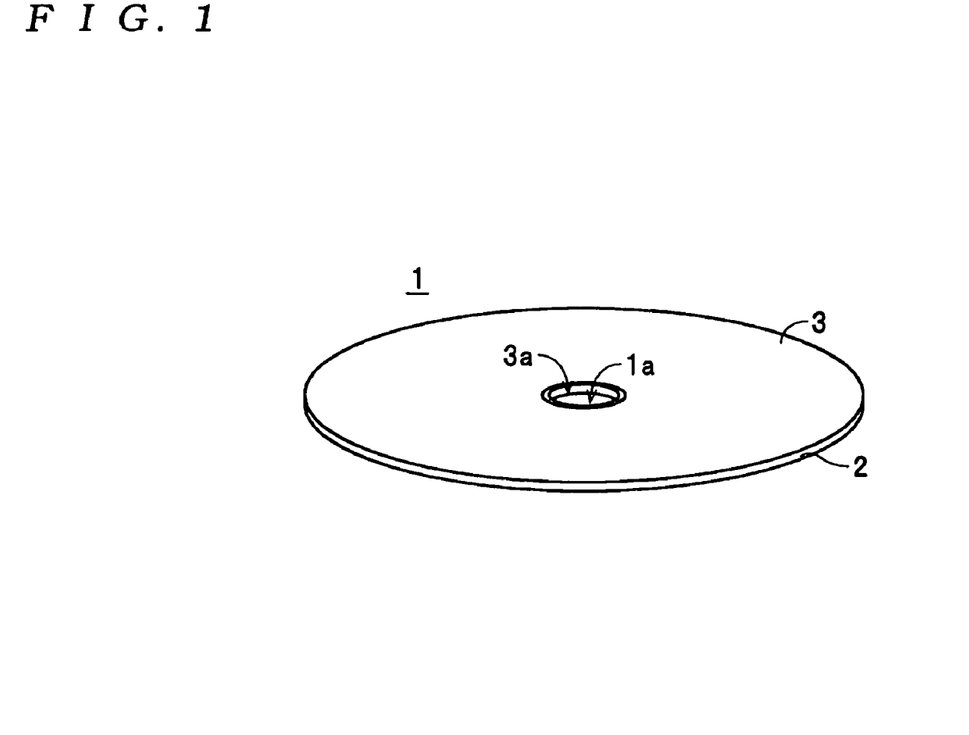
FIG. 1 is a perspective external view of an optical disc 1 according to an embodiment of the present invention.

The optical disc 1 shown in FIG. 1 corresponds to an "optical recording medium" according to the present invention, and has one or more thin films (not shown) such as a light reflecting layer formed on one surface of a disc-like substrate (hereinafter, simply "substrate") 2 and a resin layer 3 formed so as to cover the thin films. It should be noted that for ease of understanding the present invention, description of the construction and method of forming the light reflecting layer and the like has been omitted. A center hole 1a for clamping in a recording/reproduction apparatus or the like is also formed in the optical disc 1.

Figure 2:
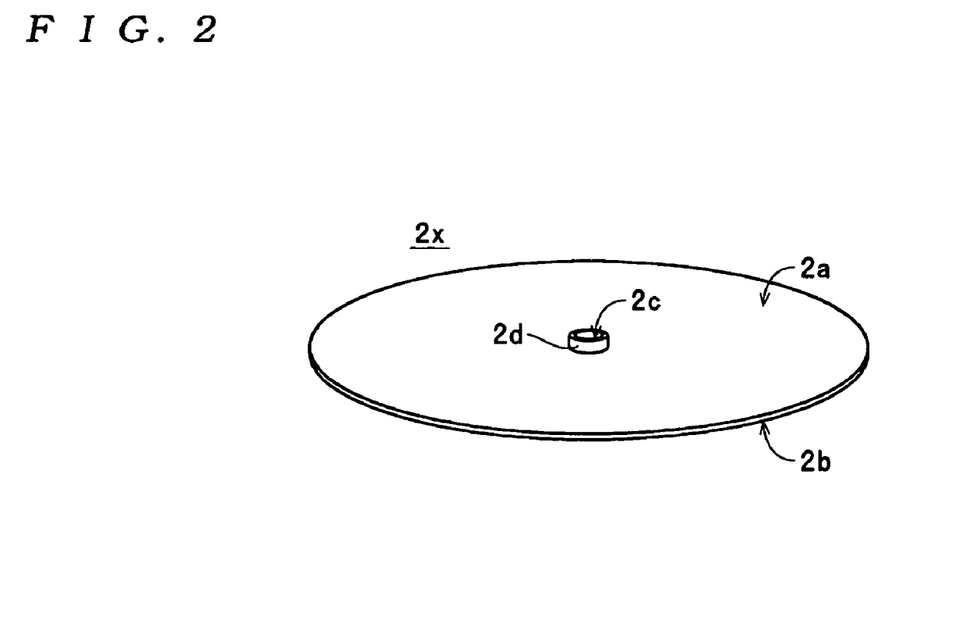
FIG. 2 is a perspective external view of a substrate 2x for the optical disc 1.
Figure 7:
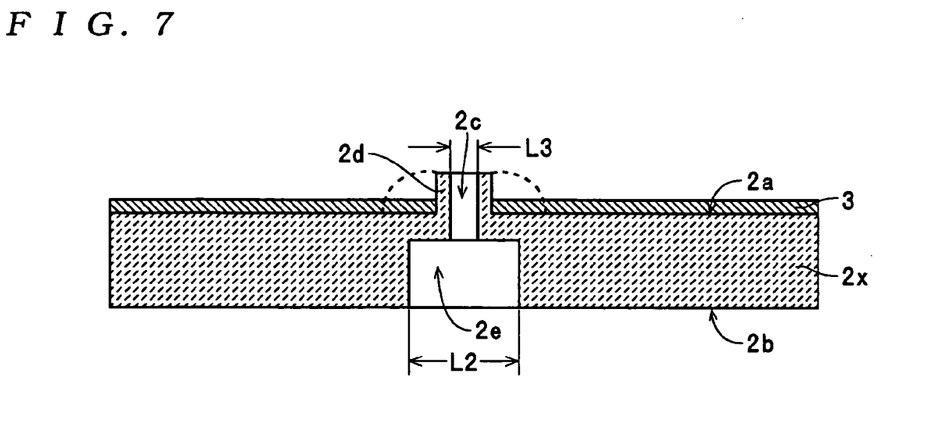
FIG. 7 is a cross-sectional view of a state where a resin layer 3 has been formed on the substrate 2x.

Before the optical disc 1 is manufactured, the substrate 2 is injection molded using a resin material such as polycarbonate. It should be noted that in the following explanation, to distinguish between the substrate 2 of a completed optical disc 1 and the substrate 2 immediately after injection molding, a substrate 2 immediately after injection molding (i.e., a substrate 2 in which the center hole 1a has not been formed) is referred to as the substrate 2x. As shown in FIG. 2, a groove and land are formed on a surface 2a of the substrate 2x by the injection molding, and a cylindrical protruding part 2d, in which a positioning through-hole 2c (a "positioning hole" for the present invention) is formed, is formed in a central part of the surface 2a. In addition, as shown in FIG. 7, a concave part 2e, which will compose the center hole 1a when a base surface thereof is subsequently punched out, is formed in a central part of a rear surface 2b. In this case, a diameter L2 of the concave part 2e is formed equal to a diameter L1 of the center hole 1a (see FIG. 13) at 15 mm, for example. The through-hole 2c is formed so that a diameter L3 thereof is 5 mm, for example, and a center thereof matches a center of the concave part 2e. The resin layer 3 is a protective layer (cover layer) for protecting one or more thin layers (a light reflecting layer, a recording layer, and the like) formed on the substrate 2, and as one example is formed with a thickness T1 (see FIG. 13) of around 100 μm by applying a UV-curing resin material by spin coating.

Figure 3:
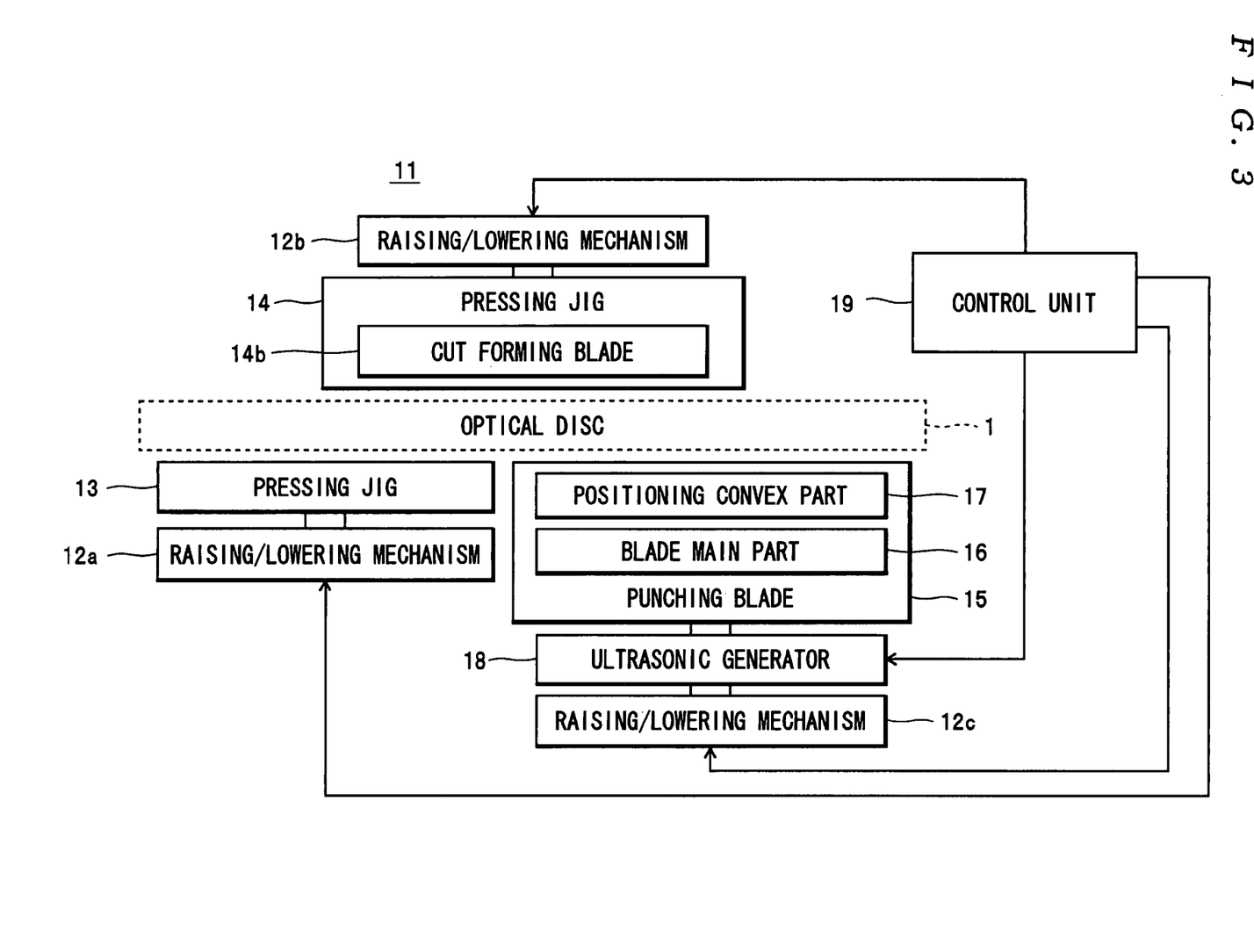
FIG. 3 is a block diagram showing the construction of a manufacturing apparatus 11.
Figure 4:
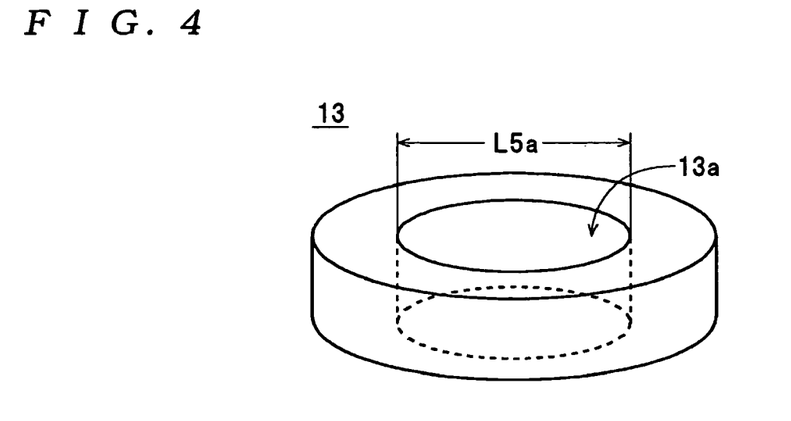
FIG. 4 is a perspective external view of a pressing jig 13 in the manufacturing apparatus 11.
Figure 5:
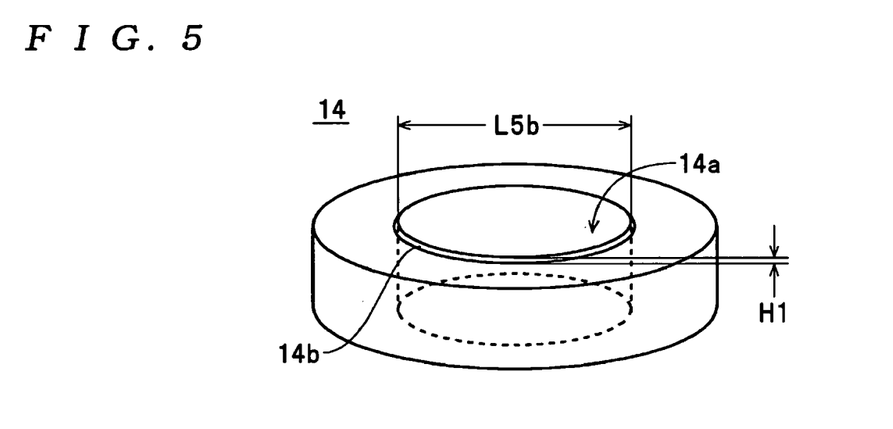
FIG. 5 is a perspective external view of a pressing jig 14 in the manufacturing apparatus 11.

On the other hand, the manufacturing apparatus 11 shown in FIG. 3 corresponds to an "optical recording medium manufacturing apparatus" for the present invention and includes raising/lowering mechanisms 12a to 12c, pressing jigs 13, 14, a punching blade 15, an ultrasonic generator 18, and a control unit 19. The raising/lowering mechanisms 12a to 12c raise and lower the pressing jigs 13, 14 and the punching blade 15 under the control of the control unit 19. The pressing jig 13 corresponds to a "substrate pressing jig" for the present invention, and as shown in FIG. 4, a through-hole 13a for allowing the punching blade 15 to pass therethrough is formed in a central part thereof, and the pressing jig 13 is formed in an overall cylindrical shape with an upper surface thereof being formed flat. In this case, a diameter L5a of the through-hole 13a is set at around 16 mm, for example. The pressing jig 14 corresponds to a "resin layer pressing jig" for the present invention, and as shown in FIG. 5, is formed in an overall cylindrical shape with a through-hole 14a for allowing a punched-out fragment punched out by the punching blade 15 when the center hole 1a is formed to pass therethrough being formed in a central part thereof. The lower surface of the pressing jig 14 (the upper surface in FIG. 5) is formed flat and a cut forming blade 14b is formed at a rim of the through-hole 14a. In this case, a diameter L5b of the through-hole 14a (that is, the internal diameter of the cut forming blade 14b) is set larger than the diameter L1 of the center hole 1a at around 16 mm. A height H1 of the cut forming blade 14b is set at around 105 μm that is slightly greater than a thickness T1 of the resin layer 3 in accordance with the depth of the cut formed in the resin layer 3 when manufacturing the optical disc 1.

Figure 6:
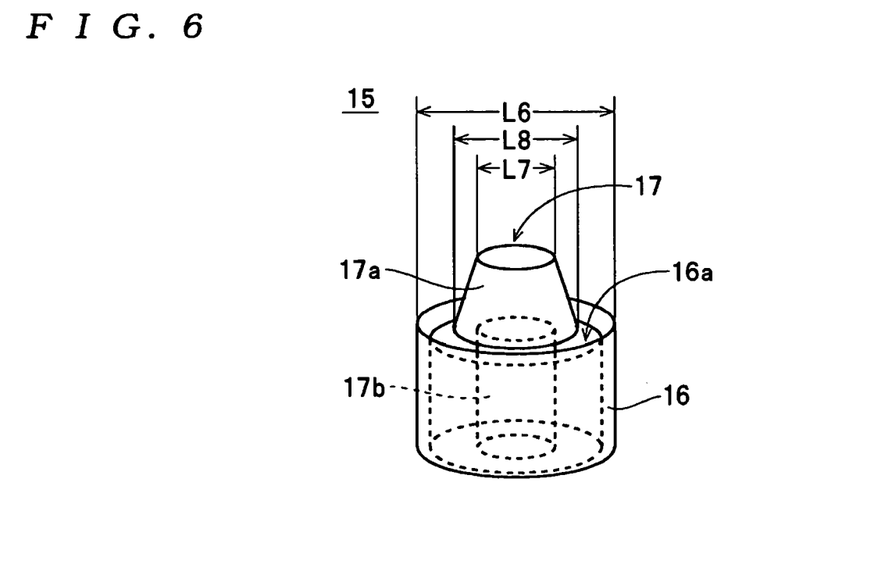
FIG. 6 is a perspective external view of a punching blade 15 in the manufacturing apparatus 11.
Figure 10:
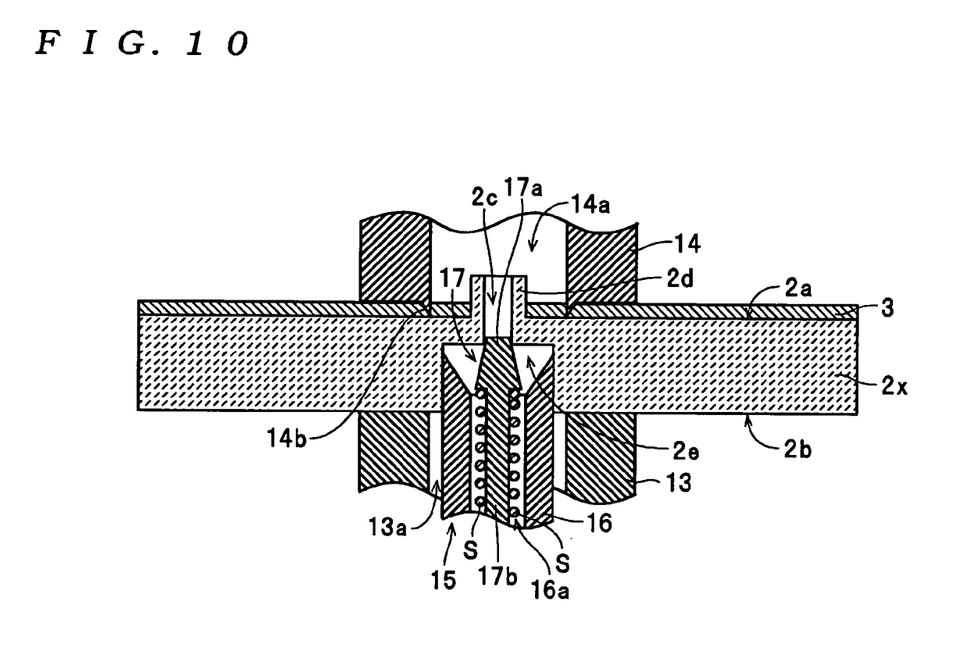
FIG. 10 is a cross-sectional view of a state where a positioning convex part 17 has been placed in contact with a rim of the through-hole 2c in the substrate 2x.

As shown in FIG. 6, the punching blade 15 includes a cylindrical blade main part 16, a positioning convex part 17 in the shape of a truncated cone, and a coil spring S (see FIG. 10). A diameter (external diameter) L6 of the blade main part 16 is set at 15 mm, that is, equal to the diameter L1 of the center hole 1a, and the blade main part 16 is formed in a cylindrical shape with a through-hole 16a for allowing the positioning convex part 17 to pass therethrough being formed in a central part thereof. The positioning convex part 17 includes a contact part 17a, which is trapezoidal when viewed from the side and is placed in contact with a rim of the through-hole 2c of the substrate 2x when the center hole 1a is formed (punched out) using the blade main part 16, and a shaft 17b, which is integrally connected to a lower end of the contact part 17a and over which the coil spring S is disposed in the periphery. Here, the positioning convex part 17 is formed so that a diameter L7 at an upper end of the contact part 17a is smaller than the through-hole 2c of the substrate 2x (as one example, around 4 mm) and a diameter L8 at a lower end thereof is larger than the through-hole 2c (as one example, around 6 mm). In addition, the positioning convex part 17 is attached to the blade main part 16 so as to be capable of up-down movement and is energized upward by the coil spring S so that the contact part 17*a* protrudes from an upper end of the blade main part 16.

The ultrasonic generator 18 generates ultrasound under the control of the control unit 19 and causes the blade main part 16 of the punching blade 15 to vibrate by transmitting the ultrasound to the blade main part 16. The control unit 19 controls the operation of the raising/lowering mechanisms 12*a* to 12*c* and the ultrasonic generator 18. It should be noted that for ease of understanding the present invention, the construction of the applying apparatus that spin coats the substrate 2*x* with the resin material and the method of applying have been omitted from the explanation and drawings.

Next, the method of manufacturing the optical disc 1 will be described with reference to the drawings. It should be noted that the injection molding of the substrate 2*x* and the formation of thin layers on the surface 2*a* of the substrate 2*x* are assumed to have been completed already.

First, the surface 2*a* of the substrate 2*x* is spin coated with the resin material. When doing so, in a state where the substrate 2*x* is set in an applying apparatus, the substrate 2*x* is rotated and the resin material is dripped onto the surface 2*a*. At this time, as shown by the broken line in FIG. 7, by dripping the resin material onto the periphery of an outer wall of the protruding part 2*d*, it is possible to uniformly spread out the resin material in the same way as a conventional spin coating method developed by the applicant (a method where resin material is dripped at a central part of a substrate in which no center hole has been formed). Next, by appropriately adjusting the rotational speed of the substrate 2*x*, the resin material is spread out uniformly over the entire surface 2*a* by the centrifugal force that accompanies the rotation. After this, the substrate 2*x* in this state is irradiated with UV rays to harden the resin material. By doing so, as shown in FIG. 7, the resin layer 3 is formed with a uniform thickness on the surface 2*a* of the substrate 2*x*.

Figure 8:
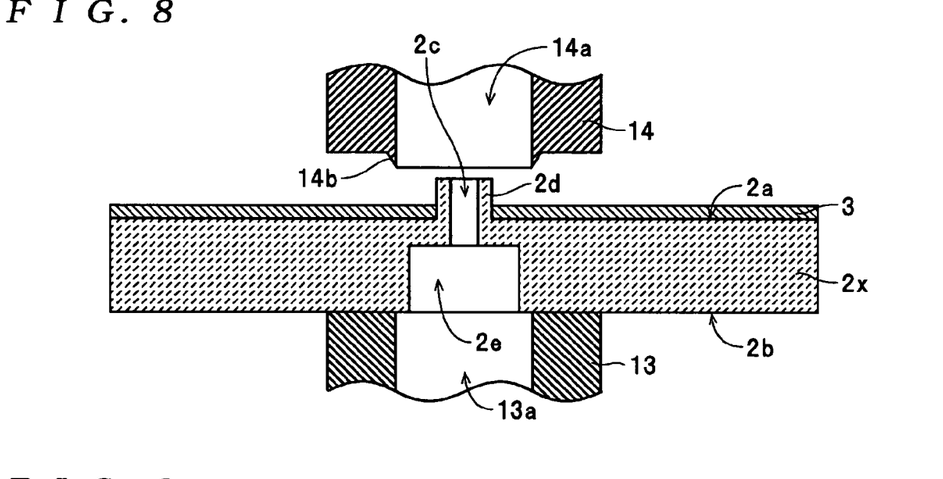
FIG. 8 is a cross-sectional view of a state where the pressing jig 13 has been placed in contact with the rear surface of the substrate 2x.
Figure 9:
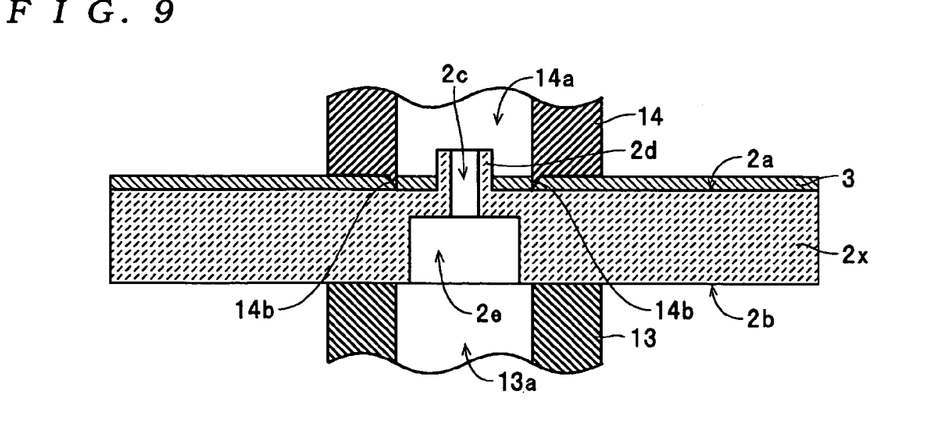
FIG. 9 is a cross-sectional view of a state where the pressing jig 14 has been placed in contact with the resin layer 3 to form a cut.

After this, the center hole 1*a* is formed in the substrate 2*x* on which the resin layer 3 has been formed. At this time, the control unit 19 first has the raising/lowering mechanism 12*a* raise the pressing jig 13 so that the pressing jig 13 contacts the rear surface 2*b* of the substrate 2*x* as shown in FIG. 8. Next, as shown in FIG. 9, the control unit 19 has the raising/lowering mechanism 12*b* lower the pressing jig 14 so that the cut forming blade 14*b* is pressed into the resin layer 3. Here, since the cut forming blade 14*b* is formed with a height H1 that is slightly larger than the thickness T1 of the resin layer 3, by having the raising/lowering mechanism 12*b* place the lower surface of the pressing jig 14 in contact with the surface of the resin layer 3, the blade of the cut forming blade 14*b* reaches the surface 2*a* of the substrate 2*x*. By doing so, a round cut is formed in the resin layer 3 with a diameter equal to the diameter L5*b* of the cut forming blade 14*b* (in this case, 16 mm).

Figure 11:
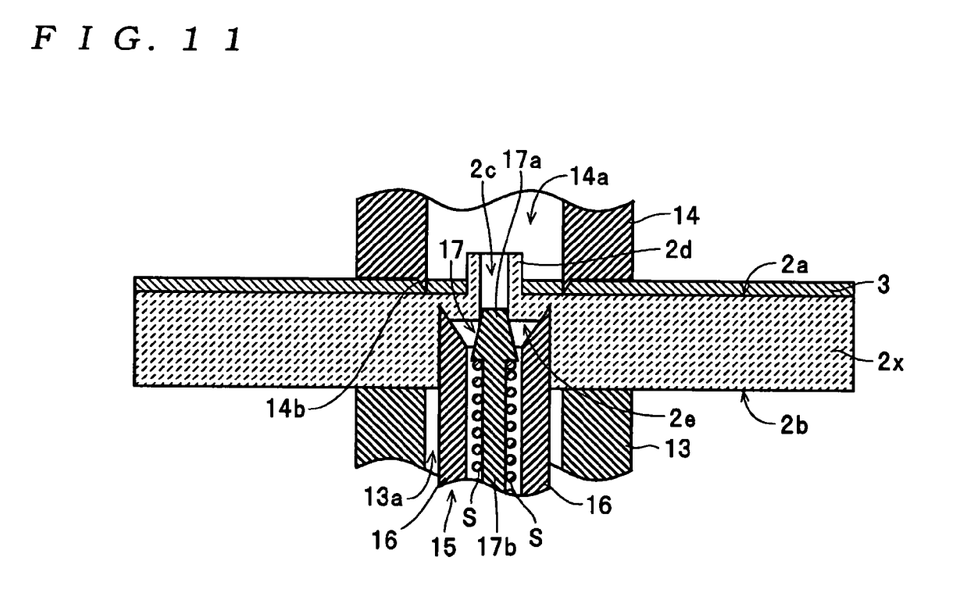
FIG. 11 is a cross-sectional view of a state where a blade main part 16 of the punching blade 15 has been pressed into a base surface of a concave part 2e.

After this, the control unit 19 has the raising/lowering mechanisms 12*a*, 12*b* respectively place the pressing jigs 13, 14 in contact with the substrate 2*x* and while maintaining this state, has the raising/lowering mechanism 12*c* raise the punching blade 15. At the same time, the control unit 19 causes the ultrasonic generator 18 to generate ultrasound and vibrate the blade main part 16. At this time, as shown in FIG. 10, first the contact part 17*a* of the positioning convex part 17 contacts (engages) the rim of the through-hole 2*c* inside the concave part 2*e* of the substrate 2*x*. Here, even if the center of the punching blade 15 and the center of the substrate 2*x* (that is, the center of the through-hole 2*c*) are displaced, the upper end of the contact part 17*a* engages the through-hole 2*c* to move the punching blade 15 relative to the substrate 2*x* so that the center of the punching blade 15 and the center of the substrate 2*x* are aligned. Next, by further raising the punching blade 15 using the raising/lowering mechanism 12*c*, the blade main part 16 is placed in contact with the base surface of the concave part 2*e* and by further raising the blade main part 16, the blade edge of the blade main part 16 is pressed into the substrate 2*x* as shown in FIG. 11. At this time, since the ultrasonic generator 18 causes the blade main part 16 to vibrate using ultrasound, the blade main part 16 can be smoothly pressed into the substrate 2*x*.

Figure 12:
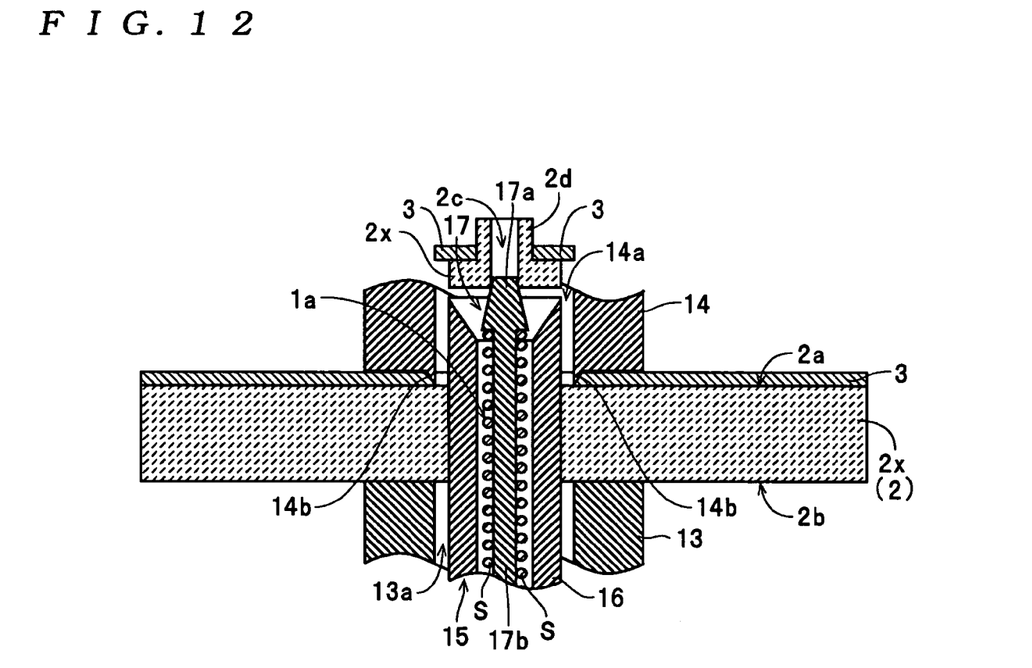
FIG. 12 is a cross-sectional view of a state where the center hole 1a has been punched out by the blade main part 16.
Figure 13:
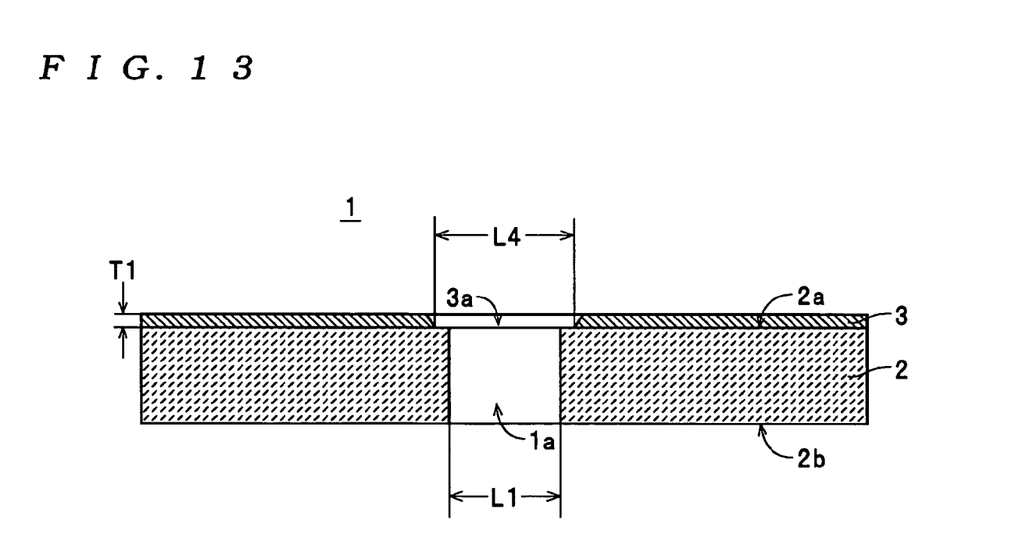
FIG. 13 is a cross-sectional view of an optical disc 1.

After this, the punching blade 15 is further raised and when the blade edge of the blade main part 16 has reached the surface 2*a* of the substrate 2*x*, as shown in FIG. 12, the periphery of the protruding part 2*d* in the substrate 2*x* is punched out to form the center hole 1*a*. At this time, since the cut has been formed in the resin layer 3 by the cut forming blade 14*b*, when the blade edge of the blade main part 16 has reached the surface 2*a*, the resin layer 3 inside the cut forming blade 14*b* of the pressing jig 14 is pulled off the surface 2*a* (the edge of the center hole 1*a*) of the substrate 2*x* by the force that raises the blade main part 16. By doing so, as shown in FIG. 13, a hole 3*a* with a larger diameter L4 (in this case, 16 mm, which is equal to the diameter L5*b* of the cut forming blade 14*b*) than the diameter L1 of the center hole 1*a* is formed in the resin layer 3, thereby completing the optical disc 1.

In this way, according to the method of manufacturing and the manufacturing apparatus 11 for the optical disc 1, after a circular cut with a larger diameter than the center hole 1*a* has been formed in the resin layer 3 by the cut forming blade 14*b* of the pressing jig 14 so as to surround the formation position of the center hole 1*a*, the center hole 1*a* is punched out and formed by pressing in the blade main part 16 of the punching blade 15 from the rear surface 2*b* side of the substrate 2*x*, so that detachment of the resin layer 3 from the surface 2*a* of the substrate 2*x* can be avoided when the center hole 1*a* is formed by pressing the blade main part 16 into the substrate 2*x*. In addition, by forming the hole 3*a* whose diameter L4 is larger than the diameter L1 of the center hole 1*a* in the resin layer 3 of the optical disc 1 after manufacturing, when the optical disc 1 is clamped in a recording/reproduction apparatus, chafing of the resin layer 3 (the rim of the hole 3*a*) can be avoided, and as a result, detachment of the resin layer 3 during clamping can be avoided. In addition, by forming the cut in the resin layer 3 in advance, it is possible to avoid the production of burrs in the resin layer 3 during formation of the center hole 1*a* by punching out. Here, by forming the cut with a depth that reaches the surface 2*a* of the substrate 2*x* using the cut forming blade 14*b*, it is possible to reliably avoid the detachment of the resin layer 3 during formation of the center hole 1*a* by punching out. Also, according to the method of manufacturing and manufacturing apparatus 11 for the optical disc 1, by forming the cut by placing the pressing jig 13 in contact with the rear surface 2*b* of the substrate 2*x* and pressing the cut forming blade 14*b* into the resin layer 3 while this state is maintained, bending of the substrate 2*x* when the cut forming blade 14*b* is pressed into the resin layer 3 can be avoided, so that the resin layer 3 can be reliably cut by placing the blade edge of the cut forming blade 14*b* in contact with the surface 2*a* of the substrate 2*x*.

Also, according to the method of manufacturing and manufacturing apparatus 11 for the optical disc 1, by forming the center hole 1*a* by placing the pressing jig 14 in contact with the resin layer 3 and pressing the blade main part 16 into the substrate 2*x* while this state is maintained, bending of the substrate 2*x* when the blade main part 16 is pressed into the substrate 2*x* can be avoided, so that damage to the substrate 2*x* and detachment of the resin layer 3 due to bending of the substrate 2*x* can be avoided. In addition, by pressing the rim of the hole 3*a* of the resin layer 3 using the pressing jig 14, detachment of the resin layer 3 at the rim of the hole 3*a* when the blade main part 16 reaches the surface 2*a* of the substrate 2*x* can be avoided. Also, according to the method of manufacturing and manufacturing apparatus 11 for the optical disc 1, by forming the cut in the resin layer 3 by placing the pressing jig 14 on which the cut forming blade 14b has been formed with a height H1 in accordance with the depth of the cut to be formed in the resin layer 3 (in this case, a substantially equal height to the thickness T1 of the resin layer 3) in contact with the resin layer 3, compared to a method where the cut is formed by a dedicated cut forming blade, the cut forming blade is then placed on standby and a pressing jig that is dedicated to pressing the resin layer is placed in contact with the resin layer 3, the cut can be formed with the cut forming blade 14b by merely placing the pressing jig 14 in contact with the resin layer 3 and the blade main part 16 can be pressed in while the resin layer 3 is pressed in this state. For this reason, the cut and the center hole 1a can be formed quickly and easily while avoiding damage and the like to the substrate 2x. In addition, according to the method of manufacturing and manufacturing apparatus 11 for the optical disc 1, by pressing the blade main part 16 into the substrate 2x while applying ultrasound generated by the ultrasonic generator 18 to the blade main part 16, the center hole 1a can be formed by smoothly pressing the blade main part 16 into the substrate 2x.

According to the method of manufacturing the optical disc 1, by forming the concave part 2e with the same diameter as the center hole 1a at the formation position of the center hole 1a in the rear surface 2b of the substrate 2x when the substrate 2x is formed, compared to a method where the center hole 1a is formed by pressing the blade main part 16 into a substrate in which the concave part 2e has not been formed, the substrate punched out by the blade main part 16 can be formed thinly, so that the center hole 1a can be easily formed. In this case, by forming the concave part 2e with the diameter L2 that is equal to the diameter L1 of the center hole 1a, it is possible to have an inner wall surface of the concave part 2e function as a guide for the blade main part 16, and as a result, the formation of the center hole 1a in an eccentric position can be avoided. Additionally, according to the manufacturing apparatus 11, by constructing the punching blade 15 so as to include the positioning convex part 17 which is formed so as to be able to engage the through-hole 2c formed in the center of the substrate 2x, which is attached to the center of the blade main part 16 via the coil spring S, and which protrudes further than the blade edge of the blade main part 16, it is possible to have the contact part 17a of the positioning convex part 17 contact the rim of the through-hole 2c before the blade main part 16 to align the center of the punching blade 15 and the center of the substrate 2x, so that the formation of the center hole 1a at an eccentric position can be reliably avoided.

It should be noted that the present invention is not limited to the above embodiment. For example, although an example where the cut forming blade 14b is formed with a height H1 (here, 105 μm) that is slightly greater than the thickness T1 (here, 100 μm) of the resin layer 3 has been described in the above embodiment, the present invention is not limited to this, and by forming the cut forming blade 14b even higher (as one example, 120 μm), during the formation of the cut, it is possible to press the blade edge of the cut forming blade 14b into the substrate 2x and form a cut therein. By doing so, it is possible to cut off the resin layer 3 more reliably, and as a result, it is possible to avoid a situation where the resin layer 3 that should be punched out together with the substrate 2x during the formation of the center hole 1a is left in the periphery of the center hole 1a. Also, although an example where the cut and the center hole 1a are formed by disposing the pressing jig 14 above the substrate 2x and disposing the pressing jig 13 and the punching blade 15 below has been described in the above embodiment, the present invention is not limited to this, and it is also possible to use a construction where the pressing jig 14 is disposed below the substrate 2x and the pressing jig 13 and the punching blade 15 are disposed above. In this case, the substrate 2x is disposed with the rear surface 2b facing upward when forming the cut and the center hole 1a.

INDUSTRIAL APPLICABILITY

As described above, according to this method of manufacturing an optical recording medium, after a circular cut whose diameter is larger than the center hole is formed in the resin layer so as to surround a formation position of the center hole, a punching blade for forming the center hole is pressed into the disc-like substrate from a second surface-side of the disc-like substrate to form the center hole, so that detachment of the resin layer from the first surface of the disc-like substrate can be avoided when the center hole is formed by pressing the punching blade into the disc-like substrate. By doing so, it is possible to realize a method of manufacturing an optical recording medium that can avoid the detachment of the resin layer and the production of burrs in the periphery of the center hole, while reducing the manufacturing cost.

The invention claimed is:

1. A method of manufacturing an optical recording medium by forming a resin layer on a first surface of a disc-like substrate and then forming a center hole that passes through the disc-like substrate and the resin layer,
   wherein the center hole is formed by forming, in the resin layer, a circular cut with a larger diameter than the center hole so as to surround a formation position of the center hole and then pressing a punching blade for forming the center hole into the disc-like substrate from a second surface side of the disc-like substrate.

2. A method of manufacturing an optical recording medium according to claim 1,
   wherein the cut is formed in the resin layer with a depth that reaches the first surface.

3. A method of manufacturing an optical recording medium according to claim 1,
   wherein a substrate pressing jig is placed in contact with the second surface of the disc-like substrate and the contact is maintained while the cut is formed in the resin layer.

4. A method of manufacturing an optical recording medium according to claim 1,
   wherein a resin layer pressing jig is placed in contact with the resin layer and the contact is maintained while the center hole is formed by pressing the punching blade into the disc-like substrate.

5. A method of manufacturing an optical recording medium according to claim 4,
   wherein the cut is formed in the resin layer by placing the resin layer pressing jig, in which a cut forming blade is formed with a height in accordance with a depth of the cut, in contact with the resin layer.

6. A method of manufacturing an optical recording medium according to claim 1,
   wherein the center hole is formed by pressing the punching blade into the disc-like substrate while the punching blade is vibrated by ultrasound.

7. A method of manufacturing an optical recording medium according to claim 1,
   wherein when the disc-like substrate is molded, a concave part with an equal diameter or a substantially equal diameter to the center hole is formed at the formation position of the center hole in the second surface of the disc-like substrate.

* * * * *